Nov. 5, 1968   R. C. AMMER ET AL   3,409,250
MOVABLE FAIRING FOR AN AIRCRAFT-MOUNTED NOZZLE
Filed Dec. 27, 1966   2 Sheets-Sheet 1
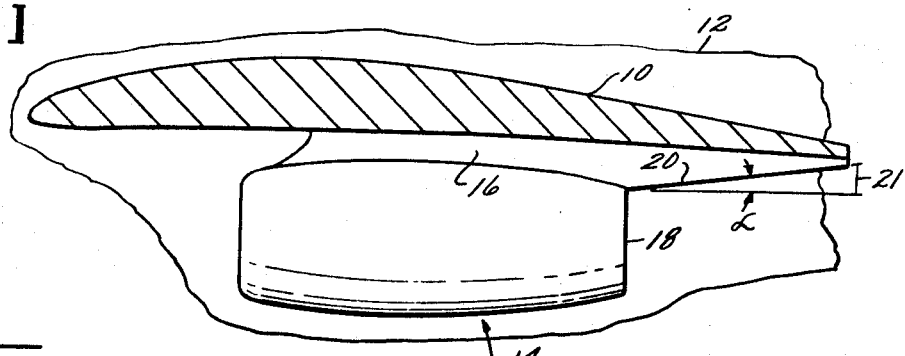
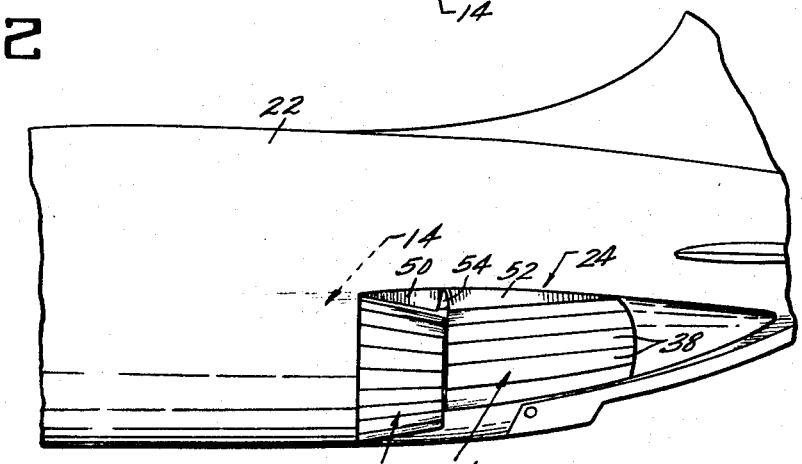
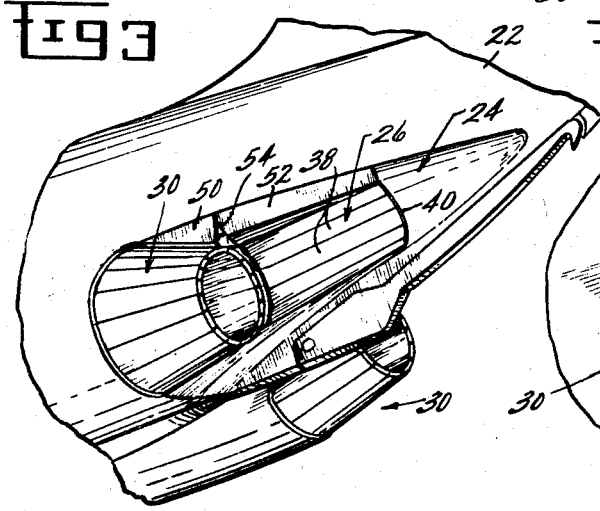 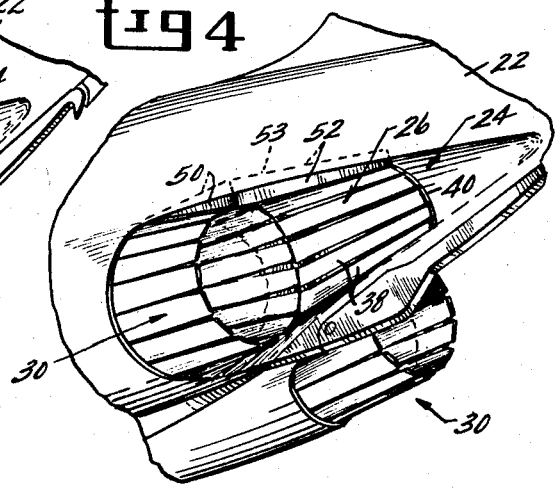
INVENTORS
ROBERT C. AMMER
GEORGE R. RABONE
ROBERT G. BEAVERS
BARTOLOMEO J. FERRARI
ATTORNEY

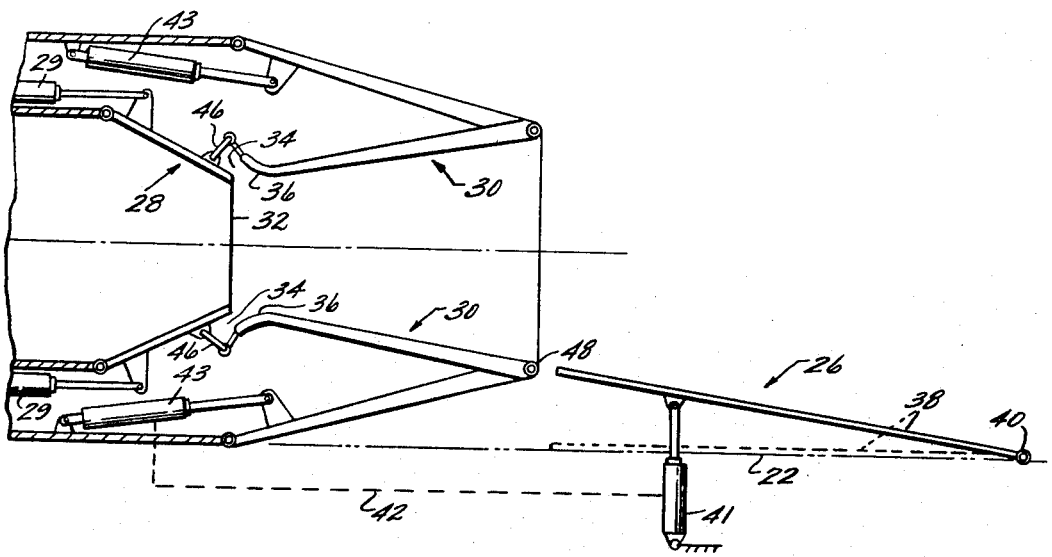
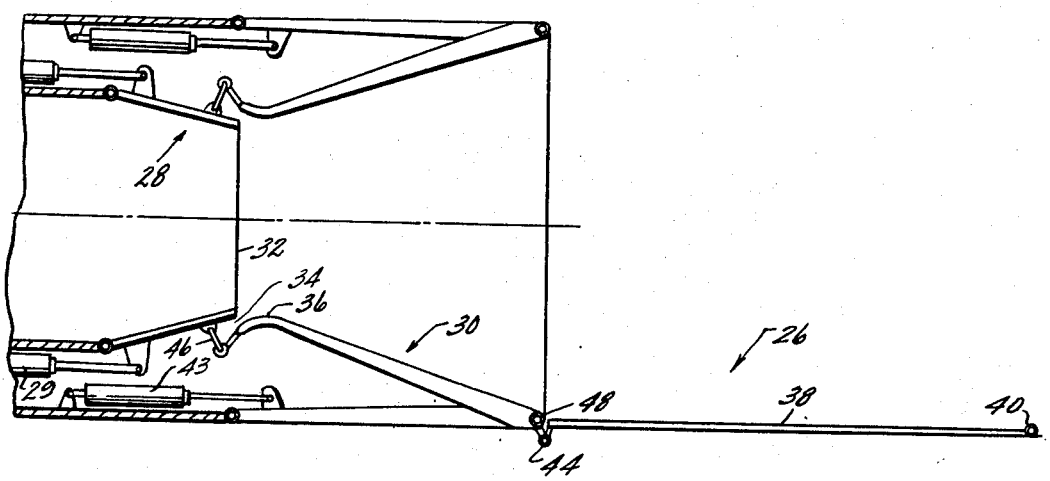

United States Patent Office 3,409,250
Patented Nov. 5, 1968

3,409,250
MOVABLE FAIRING FOR AN AIRCRAFT-MOUNTED NOZZLE
Robert C. Ammer, Cincinnati, Robert G. Beavers and Bartolomeo J. Ferrari, Mason, and George R. Rabone, Cincinnati, Ohio, assignors to General Electric Company, a corporation of New York
Filed Dec. 27, 1966, Ser. No. 604,766
12 Claims. (Cl. 244—52)

ABSTRACT OF THE DISCLOSURE

The invention relates to a jet engine nozzle structure arrangement where a preferably symmetrical nozzle is used in conjunction with a movable fairing on the fuselage downstream of the nozzle so that both the nozzle and fairing are varied together to provide a smooth continuous surface for the jet and reduce the base drag on the aircraft.

---

In a high speed aircraft and especially aircraft where the jet engine is installed relatively close to an aircraft structural member such as a wing or fuselage or adjacent engine nacelle, there tends to be interference in the flow from the exhaust nozzle with the adjacent aircraft structure. Many aircraft employ engines in close proximity to the wing and many installations employ dual engines on each side of the fuselage discharging very close or adjacent to the fuselage, the engines being symmetrically disposed on each side of the aircraft longitudinal centerline. The interference is known as base drag and is created by the tendency of the jet, by ejector action, to pump down the area between the jet and the aircraft and create a low pressure zone with a possible overexpansion of the jet. For example, in a fuselage installation, the fixed jet engine exhausts along the engine centerline which diverges from the fuselage in the aft direction because the fuselage angles in towards the aircraft centerline. The angling creates an area which is subject to pumping down by the jet and results in base drag on the aircraft. This angling in is usually referred to as the boat-tail angle and the aircraft structural surface formed by one side of the angle is the surface which is subject to low pressure or pumping down and its projected area is a measure of the base drag on the aircraft.

The main object of the present invention is to provide a nozzle arrangement which greatly reduces the base drag on a combination nozzle and aircraft structure employing a preferably symmetrical nozzle configuration and variation.

Another object is to provide a nozzle arrangement so disposed that no pumping down of the adjacent aircraft structural surface occurs to result in base drag.

A further object is to provide a nozzle that produces positive pressure for thrust as opposed to a negative pressure resulting in drag.

Another object is to provide a convergent-divergent nozzle with a primary symmetrically variable area flap nozzle and a secondary symmetrical variable area flap nozzle to provide the necessary area variation without the base drag.

A further object is to provide such a nozzle in combination with a movable fairing on the aircraft so that the nozzle portion adjacent the aircraft and the movable fairing are interconnected by scheduling them to move together for nozzle variation.

Briefly stated, the invention is directed to a low base drag nozzle arrangement in an aircraft having an axially extending structural member such as a wing or fuselage. A jet engine is fixedly supported by the member and has nozzle means to discharge along the side of the member generally parallel to the aircraft longitudinal centerline. The nozzle means is preferably symmetrically varied. While not so limited, a preferred arrangement generally includes a primary symmetrically variable area converging flap nozzle and a secondary symmetrically variable area diverging flap nozzle for supersonic operation. Any suitable means is provided to vary the flaps together or independently. Movable fairing means are carried by the aircraft member and the fairing means extend out from the member at the upstream end of the fairing or at the ends of the secondary nozzle flaps that are adjacent the aircraft member. The fairings means smoothly fair into the aircraft member in a downstream direction to eliminate any transverse space between the aircraft member and the secondary nozzle flaps and to provide a continuous smooth surface in all nozzle positions between the flap ends, the fairing, and the aircraft member to reduce drag. Suitable means is connected to move the fairing substantially transversely of the aircraft support member and means is provided interconnecting the secondary flap ends and the fairing so that they move together to maintain a smooth surface in all flap positions. The fairing preferably takes the form of a plurality of longitudinally extending slats that may be pivoted at their downstream ends to the support member. Suitable sealing curtains or slats are provided between the longitudinal slats and the fuselage and between the secondary nozzle flaps that are adjacent the fuselage and the fuselage. The upstream ends of the secondary flaps, in the case of a converging-diverging (C-D) nozzle, may be varied together or in a desired relation to the nozzle throat. The entire nozzle arrangement may be duplicated in a symmetrical pair of engines on each side of a fuselage installation.

While the specification concludes with claims particularly pointing out and distinctly claiming the subject matter which is regarded as the invention, it is believed the invention will be better understood from the following description taken in connection with the accompanying drawings in which:

FIG. 1 is a partial schematic drawing of a wing mounted installation illustrating the base drag area;

FIG. 2 is a general partial view of a typical dual engine fuselage installation;

FIG. 3 is a partial perspective of the aft end of a dual fuselage installation illustrating the nozzle arrangement in cruise position;

FIG. 4 is a view similar to FIG. 3 illustrating the nozzle arrangement in the open or reheat position;

FIG. 5 is a diagrammatic view of a C-D nozzle in cruise position showing the preferred form of the connection for maving the nozzle flaps and fairing together; and FIG. 6 is a view similar to FIG. 5 showing the nozzle in the reheat position with a modification of the actuating mechanism.

Referring first to FIG. 1, there is shown a general view of an engine installation on an aircraft structural member such as a wing 10 that is carried by aircraft 12. Wing 10 extends axially of and fixedly supports an engine 14 by conventional pylon 16 whereby the engine exhausts along the pylon through nozzle 18 longitudinally of the aircraft centerline to provide thrust to the aircraft in a known manner. Where the structural support member extends rearwardly of the nozzle as surface 20 and angles away from the surface, it will be apparent that an angle $\infty$ is formed between the surface and the centerline of thrust. This surface 20, which is a closely adjacent surface, tends to be evacuated or pumped down by the ejector action of the jet to result in a low pressure area between the surface and the edge of the exhaust jet. Thus, an area projected transversely at 21 creates what is known as base drag on the aircraft engine combination. The angle $\infty$, known as the boat-tail angle, should be kept as low as possible to reduce the drag.

Referring next to FIG. 2, a more general fuselage installation for the application of the instant invention will be described. However, the principles and structure described are equally applicable to FIG. 1. Additionally, the invention will be described as applied to a generally cylindrical nozzle structure although it will be apparent that it is not limited to a cylindrical shape but may be other than cylindrical. In FIG. 2, a pair of jet engines 14 are supported by an adjacent aircraft structural member which, for convenience of description, may be fuselage 22. It will be apparent that a single engine may be used and the operation is the same. In the dual engine installations, an engine 14 appears symmetrically on opposite sides of the longitudinal centerline of the aircraft as seen in FIG. 3 and only one engine installation need be described since the operation of both is identical. The installation shown in FIG. 2 results in a jet thrust discharge adjacent the supporting fuselage member preferably substantially parallel to the longitudinal centerline of the engine. The proximity to the fuselage 22 results in a pumping down of the fuselage surface adjacent the jet and a possible overexpansion of the jet and high base drag. In the case of cylindrical nozzles as described for convenience, this area is generally semi-cylindrical as shown at 24 in FIG. 2. Of course the proximity of the exhaust to the aircraft structure depends on the particular installation and the nozzle to be described would be tailored to that installation. Thus, area 24 may be larger or considerably smaller.

Since the invention is described in connection with a high speed aircraft, it is common to use a converging-diverging or C-D nozzle which is generally well known. The invention is equally applicable to a subsonic converging nozzle as shown in FIG. 2 with a single set of flaps but a dual flap C-D nozzle will be described for convenience.

It will be apparent that any positive pressure along surface 20 in FIG. 1 as provided by this invention or the equivalent fuselage surface 24 of FIG. 2 results in thrust on the aircraft whereas negative pressure would result in drag on the aircraft. The amount of pressure is a measure of the aircraft drag, the maximum pressure obtainable being that available in the jet exhaust itself.

In order to overcome the boat-tail drag and the tendency to pump down the area adjacent the support structure, a filler piece or movable fairing means generally indicated in FIG. 2 at 26 may be carried by the fuselage 22 and it is used to fill in the area 24 and to cooperate with the nozzle flaps to be described. Reduction in the boat-tail drag may be accomplished by a fixed fairing unsymmetrical nozzle arrangement as disclosed in co-pending application 13D–3951 of even filing date and common assignment or it may be obtained with the invention disclosed herein which requires less design for tailoring to particular aircraft structure.

Referring to FIG. 5, a typical C-D nozzle has a primary symmetrically variable area converging flap nozzle 28 movable by any suitable controlled actuator means 29 not shown in detail. The exhaust from nozzle 28 passes into secondary variable diverging flap nozzle 30 through throat 32, the secondary nozzle providing for controlled expansion with the converging primary for supersonic operation. Suitable cooling means in the form of annulus 34 may be provided between the upstream end 36 of the secondary flaps of nozzle 30 and the downstream end of the primary flaps on nozzle 28 in order to bathe the inner surface of the secondary flaps with cooling air. Both sets of flaps are moved together or independently by suitable controlled actuating means, not shown in detail, which operate the sets of nozzle flaps so they preferably vary together to the desired position.

To reduce drag, it is desired to use the existing nozzles. Also, it is preferred that both the converging and diverging nozzles operate symmetrically although it will be apparent, as the description proceeds, that they need not do so.

Thus, in accordance with the invention, the flaps of primary nozzle 28 are symmetrically varied in the conventional manner as are the nozzle flaps in a subsonic nozzle as shown in FIG. 2. Additionally, the flaps of secondary nozzle 30 are also symmetrically varied in order to cooperate with movable fairing 26. In order to fill the space between the fuselage and the downstream end of the nozzle flaps, such as secondary flaps 30, the movable fairing 26 is provided. This may take the form of any component that fills the space and is movable with the nozzle. Preferably, it may comprise a series of longitudinally extending adjacent slats 38 as best seen in FIGS. 3 and 4. The slats are pivoted at their downstream ends 40 to the fuselage 22. The upstream ends of the slats 28 extend out from the fuselage 22 at the ends of the nozzle flaps that are adjacent the fuselage and the slats are faired into the fuselage in a downstream direction to eliminate the transverse space and provide a continuous smooth surface extension of the nozzle flaps. Thus, a continuous smooth surface is provided between the secondary flap ends, the movable fairing, and the adjacent structural member or fuselage 22 so there is no adjacent area to pump down and the drag on the aircraft is thereby considerably reduced.

Because of the movement of the flaps of nozzle 30 under different conditions of operation, it is necessary that the slats 38 move substantially transversely with the nozzle flaps to maintain the smooth surface. To this end, the downstream ends of the secondary flaps and the upstream ends of the slats are interconnected so that they vary together. As seen in FIG. 5, this interconnection may take the form of an actuator 41 to operate by interconnecting means 42 in conjunction with the actuation of the secondary flaps of nozzle 30 by actuator 43 to maintain a very slight space between the flaps of nozzle 30 and the slats 38 to provide this smooth surface in all nozzle positions. Alternately, as shown in a reheat or nozzle open position in FIG. 6, it may take the form of a simple link 44 pivotally interconnecting the two ends. In order to avoid loading the secondary nozzle 30, it may be preferable that a separate actuator 41 be used. Additionally, the varying together of the primary and secondary nozzle flaps, as well as any spacing desired, may be maintained by interconnecting the actuators for scheduling the actuating mechanism or by a simple interconnection by link 46 as shown in FIG. 5.

Referring next to FIG. 6, to provide for nozzle variation under all operating conditions, the nozzle is seen in the reheat position where the exit area is larger. It can be seen diagrammatically that the upstream ends 40 of the secondary flaps are all varied together by link 46 or equivalent about pivot 48 along with the downstream ends of the flaps of primary nozzle 28 and the varying is done around the full nozzle perimeter at the nozzle throat 32. Similarly the movable fairing slats 38 are also continuously varied with the secondary flaps of nozzle 30 either symmetrically or unsymmetrically throughout the full operating range so that a preferably symmetrical variation of the exit of the engine nozzle results in a variation of the space between the nozzle exit and the adjacent fuselage which space is taken up by slats 38 being moved to provide a smooth continuous nozzle surface.

Because the slats need not extend completely around the periphery of the nozzle exit but are used only adjacent the supporting member such as the fuselage, they may be suitably formed to fit closely. Any tongue and groove sealing means or equivalent may be used between the slats. Additionally, it will be apparent that a sealing means is required between the secondary nozzle flaps adjacent the fuselage and between the slats and the fuselage. To this end as seen in FIGS. 3 and 4, the sealing means may take the form of upstream side flaps or curtains 50 and similar downstream side flaps 52 both sets of flaps being substantially radially directed to slide into an opening 53 in the fuselage to the dotted position as shown in the reheat position of FIG. 4. In the closed down or cruise position, as shown in FIG. 3, the side flaps 50 and 52 are pulled from the fuselage to fill in the space between the flaps of secondary nozzle 30 and fuselage 22 and between the slats 38 and fuselage 22 respectively. Of course, duplicate side flaps are provided at the bottom of the nozzle arrangement to operate in a similar manner adjacent the fuselage. For ease of operation, side flaps 52 may be carried directly on slats 38 by any suitable connection such as a pivot since the side flaps are operated in conjunction with the operation of slats 38. In order to avoid unsymmetrical loadings on the nozzle flaps, it is preferred that the upstream side flaps 50 be connected by an overlapping or tongue and groove connection 54 or equivalent to the downstream side flaps 52 to be operated through flaps 52. Obviously, the flaps 50 might be operated by suitable connection to the nozzle flaps 30 but this would require additional strengthening of the nozzle and result in loading it unequally.

The operation of the device is shown in FIGS. 3 and 4 where the two positions of minimum cruise and maximum reheat are shown respectively. The movable fairing slats 38 cooperate at the downstream ends of the flaps of secondary nozzle 30 and move therewith to provide a continuous surface and remove any discontinuity thereby resulting in a large reduction in base drag. At the same time, the movement and cooperation in the throat area 32 of the primary and secondary nozzles provides for the necessary nozzle configuration at different flight conditions. In the modifications the movable fairing slats 38 cooperate and vary with the nozzle for drag reduction at all flight conditions.

While there have been described preferred forms of the invention, obviously modifications and variations are possible in light of the above teachings. It is therefore to be understood that within the scope of the appended claims, the invention may be practiced otherwise than as specifically described.

What we claim is:

1. For use in an aircraft, a low base drag arrangement comprising:
   an aircraft structural member;
   jet engine means supported by said member;
   a variable area flap nozzle connected to said engine terminating upstream of and disposed adjacent said member to discharge along said member to produce thrust;
   movable fairing means on said member extending out from said member at the ends of the nozzle flaps adjacent said member and fairing into said member downstream to eliminate any transverse space and provide a continuous smooth surface between said flap ends, fairing, and member to reduce drag; and
   means connected to move said fairing with the flaps to maintain said smooth surface in all flap positions.

2. Apparatus as described in claim 1 where said aircraft structural member is a fuselage and said nozzle arrangement is disposed on each side of said fuselage.

3. Apparatus as described in claim 2 where said nozzle is a convergent-divergent nozzle with upstream variable area converging primary flaps and downstream variable area diverging secondary flaps;
   the upstream and downstream ends of said secondary and primary flaps respectively being interconnected to vary together; and
   the upstream end of said fairing and downstream ends of said secondary flaps adjacent said fairing being interconnected to vary together.

4. Apparatus as described in claim 3 wherein said fairing means comprises a series of longitudinally extending adjacent slats pivoted at the downstream ends thereof to said fuselage.

5. Apparatus as described in claim 4 wherein said slats are pivoted at their upstream ends to the downstream ends of said secondary flaps adjacent said fuselage to move with said secondary flaps.

6. Apparatus as described in claim 4 having sealing means between said slats and fuselage and between said secondary flaps adjacent the fuselage and said fuselage.

7. For use in an aircraft, a low base drag nozzle arrangement comprising:
   an axially extending aircraft structural member;
   a jet engine fixedly supported by said member and having nozzle means to discharge along said member substantially parallel to the aircraft longitudinal centerline;
   said nozzle means including a primary symmetrically variable area converging flap nozzle;
   a secondary symmetrically variable area diverging flap nozzle;
   movable fairing means on said member extending out from said member at the ends of said secondary nozzle flaps adjacent said member and fairing into said member downstream to eliminate any transverse space and provide a continuous smooth surface between said flap ends, fairing, and member to reduce drag;
   means connected to move said fairing substantially transversely of said member; and
   means interconnecting said flap ends and fairing for movement together to maintain said smooth surface in all nozzle flap positions.

8. Apparatus as described in claim 7 wherein said aircraft structural member is a fuselage and said nozzle arrangement is disposed on each side of said fuselage.

9. Apparatus as described in claim 8 wherein the downstream ends of said primary nozzle flaps and upstream ends of said secondary nozzle flaps are interconnected to vary together to form a throat.

10. Apparatus as described in claim 9 wherein said fairing comprises a series of longitudinally extending adjacent formed slats pivoted at the downstream ends thereof to said fuselage.

11. Apparatus as described in claim 10 wherein said slats are pivoted at their upstream ends to the downstream ends of said secondary flaps adjacent said fuselage to move therewith.

12. Apparatus as described in claim 10 having sealing means between said slats and fuselage and between said secondary flaps adjacent the fuselage and said fuselage.

References Cited

UNITED STATES PATENTS

| | | | |
|---|---|---|---|
| 2,758,805 | 8/1956 | Graham | 244—52 |
| 3,068,645 | 12/1962 | Alford | 239—265.37 X |
| 3,209,535 | 10/1965 | Marchant et al. | 239—265.25 |
| 3,357,645 | 12/1967 | Nash et al. | 239—265.25 |

M. HENSON WOOD, JR., *Primary Examiner.*

V. C. WILKS, *Assistant Examiner.*